(12) United States Patent
Tsai

(10) Patent No.: US 10,566,833 B2
(45) Date of Patent: Feb. 18, 2020

(54) EXTERNAL BATTERY BACKUP UNIT

(71) Applicant: Hitron Technologies Inc., Hsinchu (TW)

(72) Inventor: Chen-Tung Tsai, Hsinchu (TW)

(73) Assignee: Hitron Technology Inc., Hsinchu (TW)

( * ) Notice: Subject to any disclaimer, the term of this patent is extended or adjusted under 35 U.S.C. 154(b) by 44 days.

(21) Appl. No.: 15/674,496

(22) Filed: Aug. 10, 2017

(65) Prior Publication Data

US 2018/0145537 A1 May 24, 2018

Related U.S. Application Data

(60) Provisional application No. 62/424,558, filed on Nov. 21, 2016.

(51) Int. Cl.
*H02J 9/04* (2006.01)
*H02J 7/04* (2006.01)
*H02J 7/00* (2006.01)
*H04B 3/54* (2006.01)
*H02J 9/06* (2006.01)

(52) U.S. Cl.
CPC .............. *H02J 9/04* (2013.01); *H02J 7/0029* (2013.01); *H02J 7/0068* (2013.01); *H02J 7/04* (2013.01); *H02J 9/06* (2013.01); *H04B 3/548* (2013.01)

(58) Field of Classification Search
CPC .... H02J 9/04; H02J 9/06; H02J 7/0029; H02J 7/0068; H02J 7/04; H04B 3/54; H04B 3/548
USPC .................................. 307/1, 3–4, 23, 64, 66
See application file for complete search history.

(56) References Cited

U.S. PATENT DOCUMENTS

2006/0132089 A1\* 6/2006 Ambrosio ............. H02J 7/0014
320/107

\* cited by examiner

*Primary Examiner* — Hal Kaplan
(74) *Attorney, Agent, or Firm* — Opes IP Consulting Co. Ltd.

(57) ABSTRACT

An external battery backup unit includes a battery cell set, a power relay, a charging controller, a voltage and current monitoring unit, a microcontroller and a signaling coupling unit. The charging controller is configured to monitor the status of the battery cell set and the power relay in order to determine a charging current's amplitude. The voltage and current monitoring unit monitors the status of the battery cell set to control a discharging current's amplitude. The microcontroller is configured to respond to the change of state of the charging controller, the voltage and current monitoring unit, and the battery cell set. The microcontroller further generates the external battery backup unit's system information and encapsulates it into data envelopes. The signaling coupling unit is configured to embed the data envelopes into the power transmitted to the backend system.

24 Claims, 7 Drawing Sheets

EXTERNAL BATTERY BACKUP UNIT

TECHNICAL FIELD

The present application claims priority to U.S. Provisional Application Ser. No. 62/424,558 filed on Nov. 21, 2016, titled in "External Battery Backup Unit", which is hereby incorporated by reference in its entirety.

BACKGROUNDS

Conventionally, an embedded multimedia terminal adaptor (eMTA) system is powered by a power adaptor that connects to an external power source. However, without any alternative powering means, the eMTA system may cease to function if a power outage occurs.

Stable and constant powering of the eMTA system may be achieved by wireless and/or wired means. Wireless means are expensive and have a high power loss rate. Wired means require physical wires and is less convenient.

SUMMARY

This document discloses a novel external battery backup unit. The external battery backup unit comprises a battery cell set, a power relay, a charging controller, a voltage and current monitoring unit, a microcontroller and a signaling coupling unit. The battery cell set comprises a plurality of battery cells. The power relay is configured to receive power from an external power source. The charging controller is coupled to the battery cell set and the power relay in order to receive the power from the external power source. The charging controller is configured to monitor the status of the battery cell set and the power relay in order to determine a charging current's amplitude. The voltage and current monitoring unit is coupled to the charging controller and the battery cell set. The voltage and current monitoring unit is configured to transmit the charging current from the charging controller to the battery cell set. The voltage and current monitoring unit further monitors the status of the battery cell set in order to control a discharging current's amplitude. The microcontroller is coupled to the charging controller and the voltage and current monitoring unit. The microcontroller is configured to respond to the change of state of the charging controller, the voltage and current monitoring unit, and the battery cell set. The microcontroller is further configured to generate the external battery backup unit's system information using at least one condition of the external battery backup unit. The microcontroller further encapsulates the battery backup unit's system information into a plurality of data envelopes. The signaling coupling unit is coupled to the microcontroller, the external power source, and a backend system. The signaling coupling unit is configured to transmit power of the external power source or power provided by the battery cell set to charge the backend system via a DC power line. The signaling coupling unit is further configured to embed the plurality of data envelopes into the transmitted power. The backend system is charged via the transmitted power and is informed of the external battery backup unit's system information via the plurality of embedded data envelopes.

BRIEF DESCRIPTION OF THE SEVERAL VIEWS OF THE DRAWINGS

The foregoing summary, as well as the following detailed description of this document, will be better understood when read in conjunction with the appended drawings. For the purpose of illustrating this document, some preferred embodiments are shown in the drawings. It should be understood, however, that the present document is not limited to the precise arrangements and instrumentalities shown.

In the drawings.

DETAILED DESCRIPTION

Reference will now be made in detail to the examples of this document, which are illustrated in the accompanying drawings. Wherever possible, the same reference numbers will be used throughout the drawings to refer to the same or like parts.

This document discloses an External Battery Backup Unit (ExBBU) that provides power (e.g. DC power) and system information to a backend system, such as an eMTA system. The system information includes system status reports and instructions to initiate the battery backup operation. System status reports typically include a voltage level, a current amplitude, and/or a temperature of each of the elements of the ExBBU. The system status reports may also include functionality statuses for at least all the elements of the ExBBU that respectively indicates whether the elements are normally working. In one example, the system status reports may include a charging current's amplitude and/or a discharging current of the ExBBU. When the backend system is an eMTA system, the system information meets the CableLabs eMTA requirements.

To cure problems followed by power outage, this document discloses an ExBBU that includes a plurality of battery cells. The ExBBU can charge and store power in the battery cells when it receives power from an external power source. When a power outage occurs, the ExBBU can discharge the power stored in the battery cells to ensure the system to continuously operate.

With the aid of the disclosed ExBBU, the backend system no longer needs to adopt other alternative powering means. The disclosed ExBBU, therefore, is an efficient and cost-effective solution to stable power supply.

Figure 1:
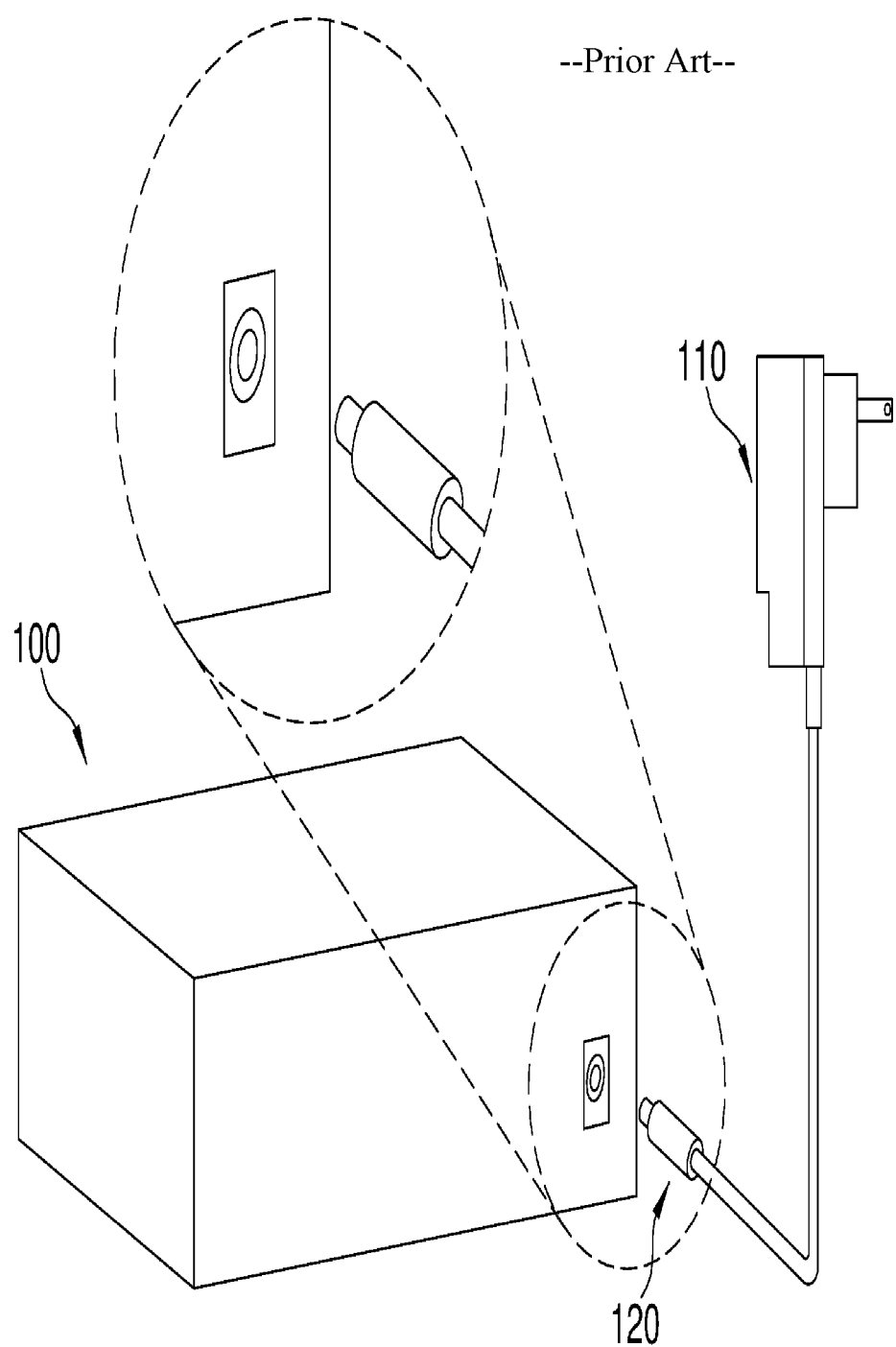
FIG. 1 illustrates the manner in which a backend system is connected to a conventional power adaptor via a connector.
Figure 2:
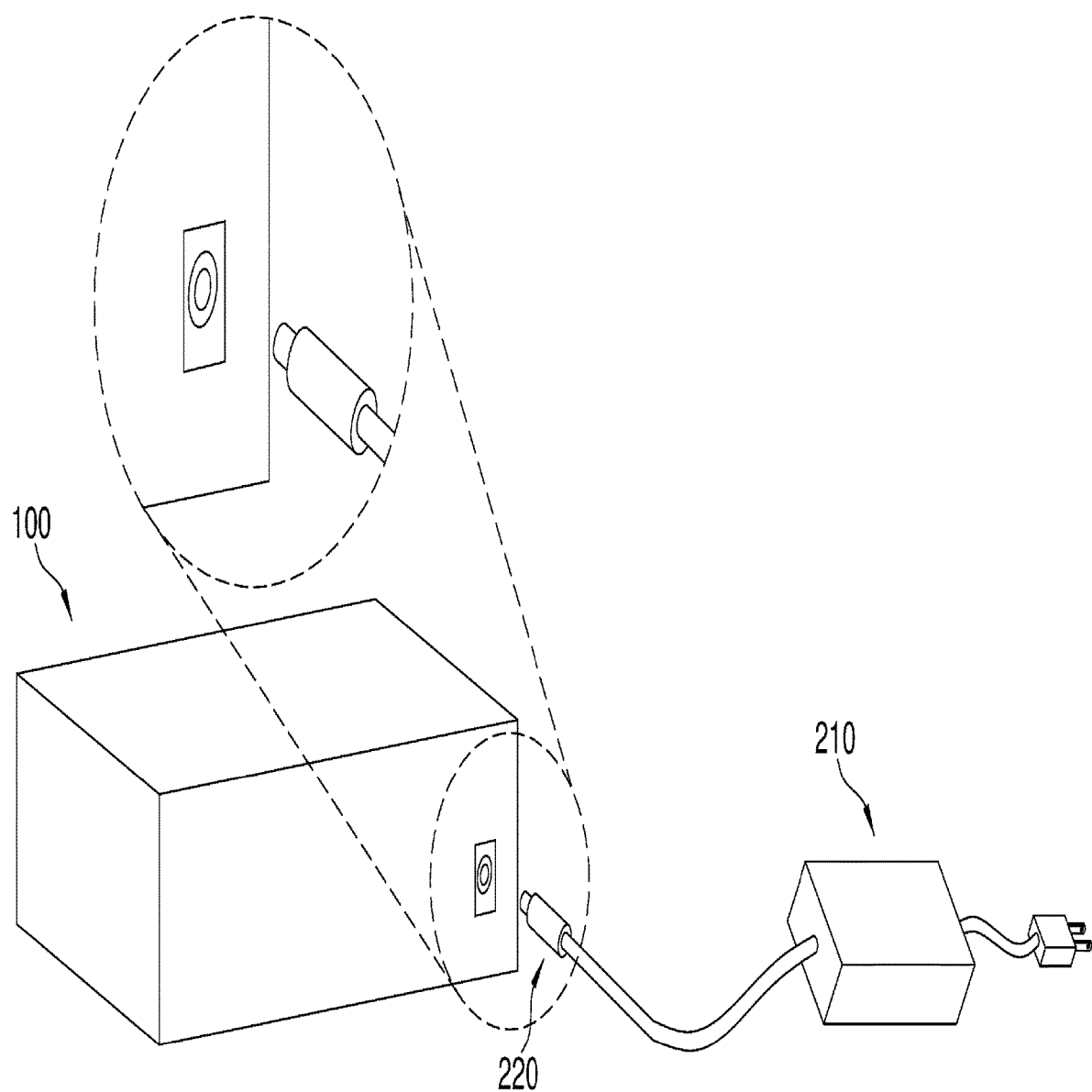
FIG. 2 illustrates the manner in which a backend system is connected to an ExBBU of the present invention via a connector according to one example of this document.

Please refer to FIG. 1 and FIG. 2. FIG. 1 illustrates a backend system 100 connecting to a conventional power adaptor 110 via a connector 120. FIG. 2 illustrates the backend system 100 connecting to an ExBBU 210 via a connector 220. In one example, the connector 220 and the connector 110 share similar shape, structure and functionalities. As a result, the backend system 100 requires no modification and no adaptor is needed when the ExBBU 210 is introduced. In another example, the ExBBU 210 has a similar size as the conventional power adaptor 110.

Figure 3:
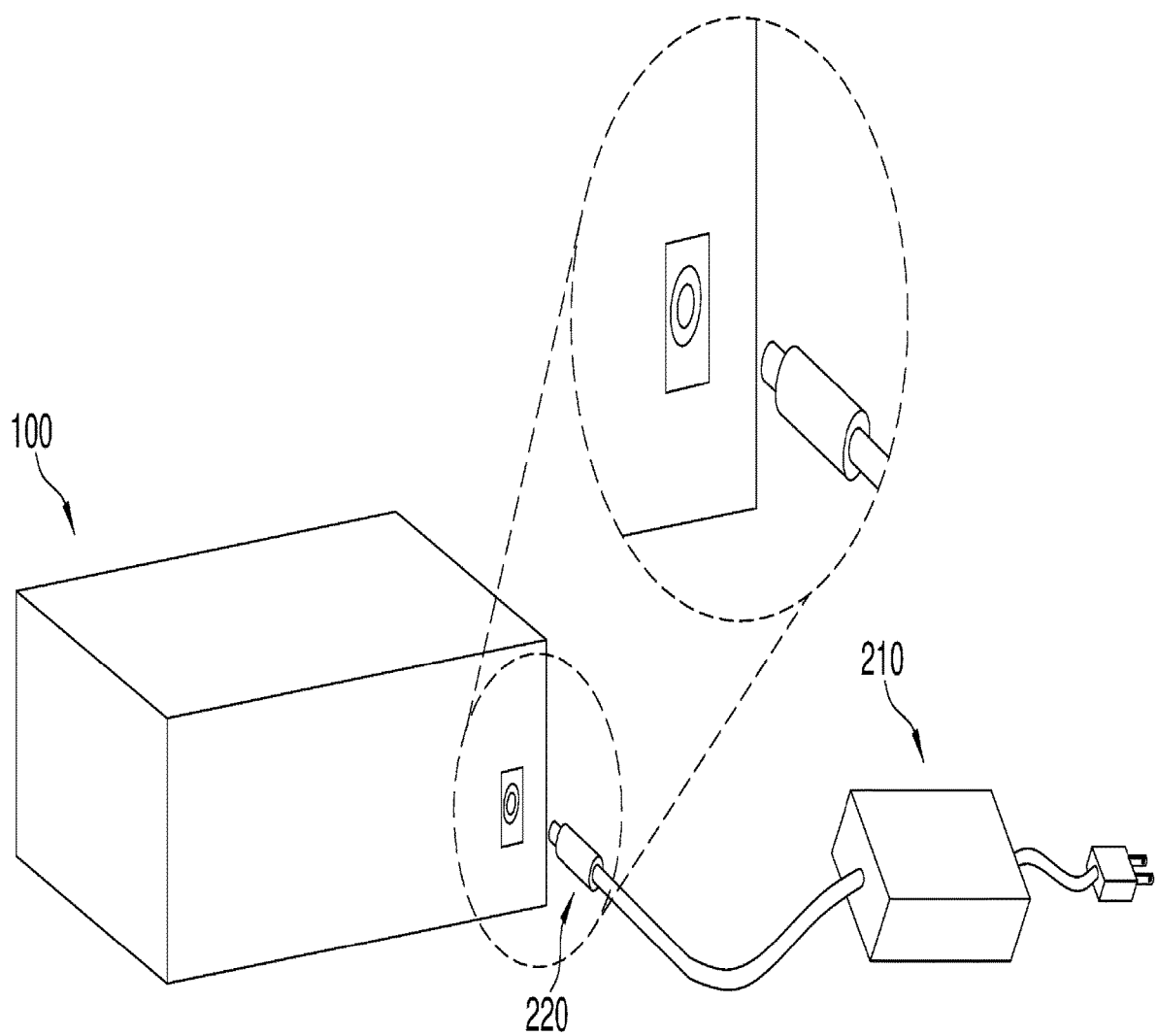
FIG. 3 is a schematic signal diagram of the power transmitted from an ExBBU to a backend system according to one example of the present invention.
Figure 3:
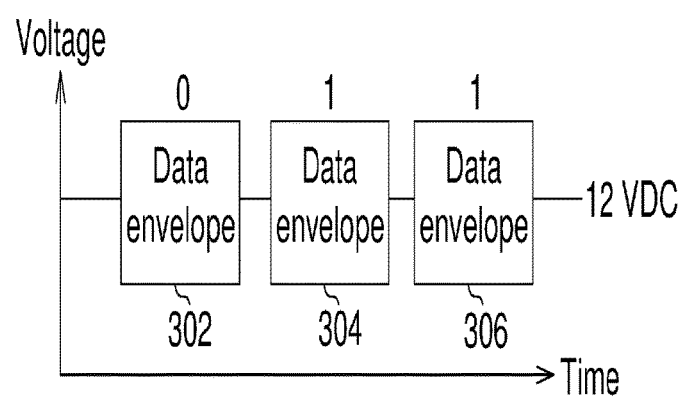

FIG. 3 is a schematic signal diagram for the power transmitted from the ExBBU 210 to the backend system 100 according to one example of the present invention. A plurality of data envelopes, e.g., data envelopes 302, 304 and 306, carry the ExBBU 210's system information and are embedded in power. Therefore, the data envelopes 302, 304 and 306 can be transmitted via the DC power line. The backend system 100 will use the ExBBU 210's system information to verify the ExBBU 210's condition, including whether the ExBBU 210 is functioning. No additional signal line is required between the ExBBU 210 and the backend system 100. That is, no additional circuitry is required in the backend system 100 in order to receive the ExBBU 210's system information.

Similarly, no additional signal terminal is required in the ExBBU 210 to transmit the system information.

Conventionally, the DC power line may not be suitable enough for data transmission because it is susceptible to interferences, such as Electro-Magnetic Compatibility (EMC) and/or Electro-Magnetic Interference (EMI). In one example of the present invention, the data envelopes embedded by the ExBBU 210 are generated using one or more exemplary signal modulations, such as On/Off Key (OOK) modulation, Frequency Shift Key (FSK) modulation, and/or Non-Return to Zero (NRZ) modulation. Such signal modulations help the ExBBU 210 to transmit data envelopes under low data rate connection. With low data rate connection, the aforementioned interferences are less likely to affect data transmission.

Figure 4:
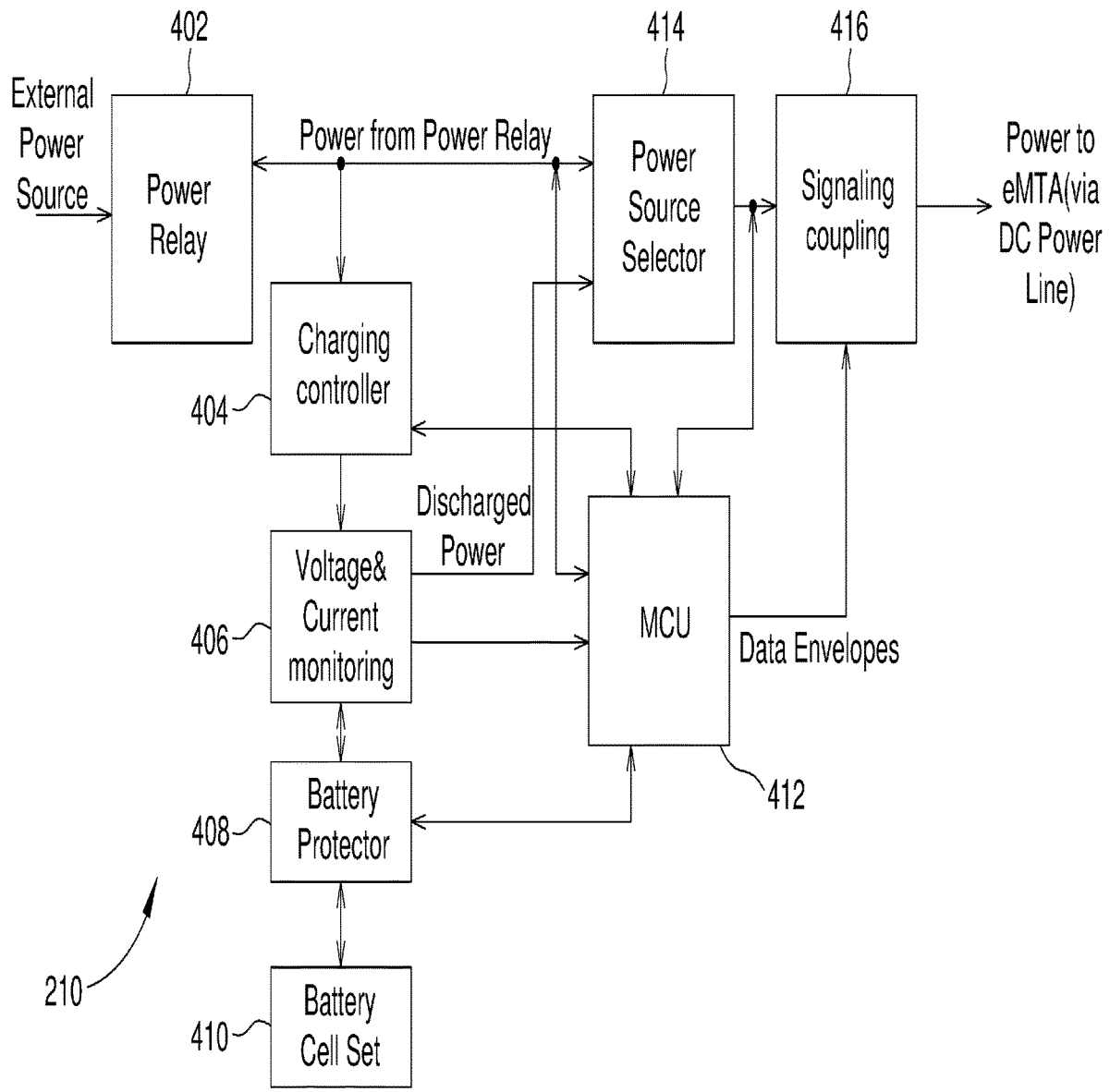
FIG. 4 is an exemplary schematic block diagram of the disclosed ExBBU of the present invention.

FIG. 4 is an exemplary schematic block diagram of the ExBBU 210. In one example, the ExBBU 210 includes a power relay 402, a charging controller 404, a voltage and current monitoring unit 406, a battery protector 408, a battery cell set 410, a low power microcontroller (MCU) 412, a power source selector 414, and a signaling coupling unit 416.

The battery cell set 410 includes a plurality of battery cells. The plurality of battery cells may be aligned and connected in series, in parallel, in the form of a matrix, or in any manageable form which allows each battery cell to be independently managed. In one example, the sizes of the plurality of battery cells may be the same, partially the same or all different.

The power relay 402 may receive power from an external power source, such as an external AC power source. The power relay 402 may also convert the received power from AC to DC. In one example, the external power source provides power of 45 watts.

The charging controller 404 receives power from the power relay 402. The charging controller 404 monitors the status of the power relay 402 and the status of the battery cell set 410 in order to determine the charging current's amplitude.

In one example, the status of the power relay 402 may include current amplitudes, voltage levels of the external power source, temperatures or states of the power relay 402. The status of the power relay 402 primarily suggests whether the power relay 402 is working normally. The charging controller 404 may increase the amplitude of the charging current when temperature of the power relay 402 drops, voltage level of the external power source increases, or when the power relay 402 is not working normally for a period of time. Conversely, the charging controller 404 may decrease the amplitude of the charging current when the temperature of the power relay 402 rises, voltage level of the external power source decreases, or when the power relay 402 has been working normally for a period of time.

In another example, the status of the battery cell set 410 may include the temperature or the voltage level of the battery cell set 410. The charging controller 404 may increase the amplitude of the charging current when the temperature or the voltage level of the battery cell set 410 drops. Conversely, the charging controller 404 may decrease the amplitude of the charging current when the temperature or the voltage level of the battery cell set 410 rises.

The voltage and current monitoring unit 406 monitors the status of the battery cell set 410 with the aid of the battery protector 408. The voltage and current monitoring unit 406 also controls and adjusts the power discharging of the battery cell set 410 with the aid of the battery protector 408. When the battery cell set 410 is charged by the charging current from the charging controller 404, the voltage and current monitoring unit 406 and the battery protector 408 also aid in transmitting the charging current to the battery cell set 410.

The battery protector 408 independently and simultaneously regulates at least one of the plurality of battery cells in the battery cell set 410. In one example, if a battery cell encounters problems, such as malfunctioning, overheating, over-charging, or power depletion, the battery protector 408 may shut down only the problematic battery cell without affecting other battery cells. If the problem is cured, the battery protector 408 may subsequently reactivate the battery cell. In one example, the battery protector 408 regulates the battery cell set 410 based on certain safety standards, e.g., Federal Communications Commission's (FCC' s) standards. In another example, the regulation of the battery cell set 410 may be preset or dynamically determined by the battery protector 408. In other example, instructions or commands from the voltage and current monitoring unit 406 or the MCU 412 can override the battery protector 408 and control the battery cell set 410.

The status of the battery cell set 410 may also include the direction of the current at its power terminal. The power terminal is located between the battery protector 408 and the battery cell set 410. The voltage and current monitoring unit 406 may monitor the current direction to confirm if the current at the power terminal is a discharging current or a charging current. When the voltage and current monitoring unit 406 detects that the current is entering the battery cell set 410, it may confirm that the current is a charging current supplied by the external power source. Likewise, when the voltage and current monitoring unit 406 detects that the current is exiting the battery cell set 410, it may confirm that the current is a discharging current provided by the battery cell set 410.

The status of battery cell set 410 may further include its operating voltage level. If the battery cell set 410's operating voltage level exceeds an upper-threshold level, the voltage and current monitoring unit 406 may determine that the battery cell set 410 is over-charged or over-heated. Under such condition, if a discharging current is provided by the battery cell set 410, the voltage and current monitoring unit 406 may instruct the battery cell set 410 to increase the amplitude of the discharging current. Conversely, if the operating voltage level drops below a lower-threshold level, the voltage and current monitoring unit 406 may instruct the battery cell set 410 to stop discharging or to decrease the amplitude of the discharging current, i.e., to avoid power depletion of the battery cell set 410.

The status of the battery cell set 410 may further include its operating temperature. If the operating temperature exceeds an upper-threshold temperature, the voltage and current monitoring unit 406 may reduce the discharging current's amplitude to prevent overheating. Conversely, if the operating temperature drops below a lower-threshold temperature, the voltage and current monitoring unit 406 may increase the discharging current's amplitude.

The MCU 412 embeds a state machine 500 that controls the ExBBU 210 to respond to changes of state. The ExBBU 210's responses via the state machine 500 will be disclosed in more details.

In one example, the MCU 412 generates the ExBBU 210's system information according to the conditions of the power relay 402, the charging controller 404, the voltage and current monitoring unit 406, the battery protector 408, the battery cell set 410, the MCU 412 itself, the power source selector 414, and/or the signaling coupling unit 416.

The conditions may include the AC/DC state of a charge current from the power relay 402, the operating voltage level of the battery cell set 410, whether a current is a charging current or a discharging current, the operating temperature of the battery cell set 410, and/or any types of abnormal condition of the ExBBU 210.

In one example, the MCU 412 reports the ExBBU 210's system information to the backend system 100 via a DC power line. The DC power line is disposed between the ExBBU 210 and the backend system 100. The MCU 412 also encapsulates the ExBBU 210's system information into a plurality of data envelopes for ease of transmitting them to the backend system 100 via the DC power line.

The power source selector 414 selects the power source to charge the backend system 100 according to the MCU 412's command. The power source selector 414 also transmits the selected power source to the signaling coupling unit 416. The selected power source may be an external power source relayed by the power relay 402 or power discharged by the battery cell set 410.

The signaling coupling unit 416 receives data envelopes that carry the ExBBU 210's system information from the MCU 412. The signaling coupling unit 416 then embeds the data envelopes into the selected power source. For instance, when the signaling coupling unit 416 supplies the selected power source to the backend system 100 via a DC power line, the ExBBU 210's system information is transmitted along with the selected power source.

In one example, the signaling coupling unit 416 includes an interference-reducing element to filter out interferences on the DC power line.

The interference-reducing element may be a diode or a transistor, such as a metal-oxide semiconductor filed-effect transistor (MOSFET).

In one example, the signaling coupling unit 416 continuously embeds data envelopes in the selected power source when an external power source supplies constant power to the ExBBU 210. However, if the external power source fails or is inactive, the signaling coupling unit 416 may embed data envelopes in a trigger-only manner, such as an interrupt-trigger manner.

Figure 5:
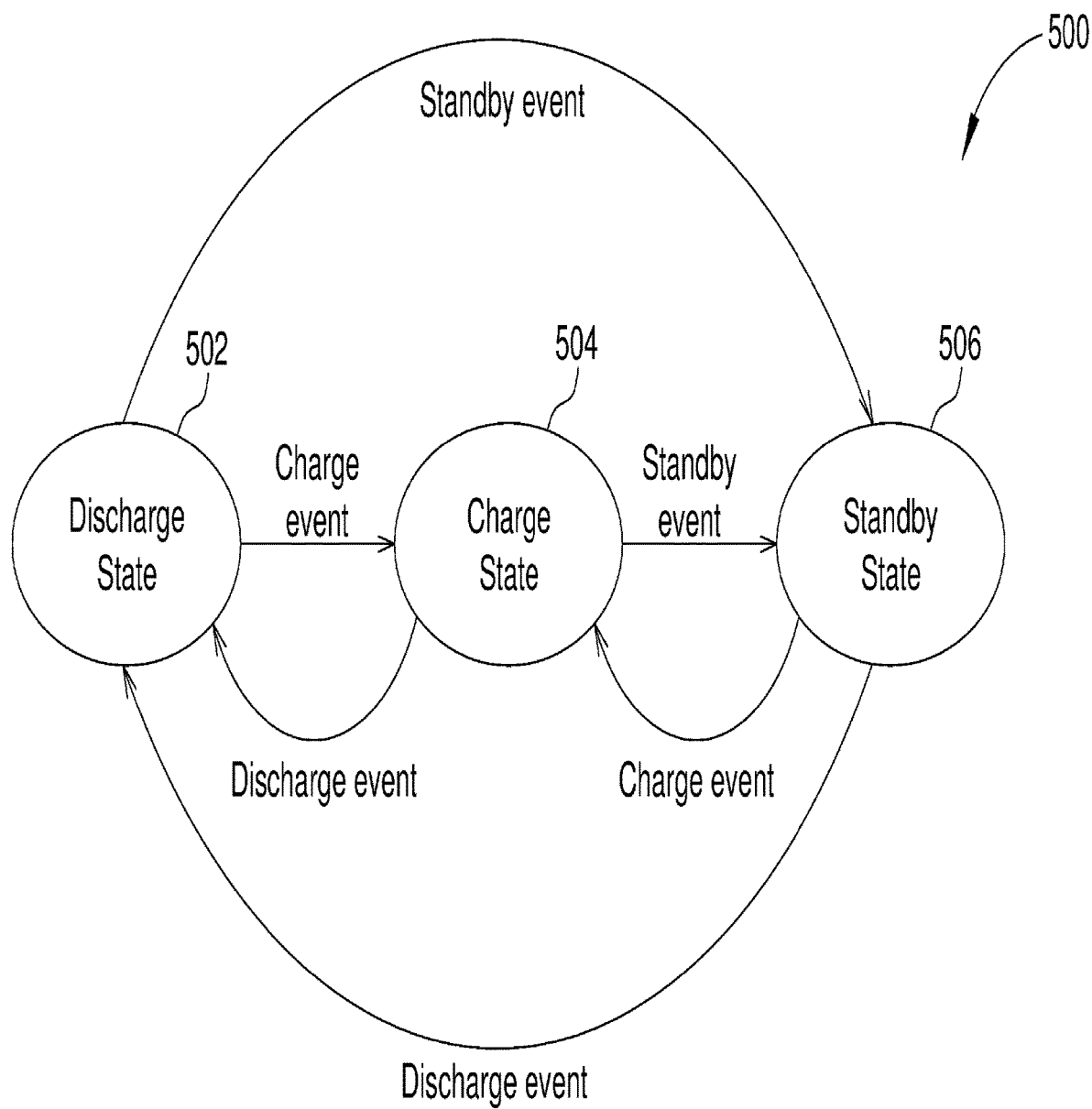
FIG. 5 illustrates the manner in which a state machine in the microcontroller shown in FIG. 4 operates in response to the change of state of the disclosed ExBBU.

FIG. 5 illustrates how the state machine 500 operates in response to the ExBBU 210's change of state. The state machine 500 includes three states: a discharge state 502, a charge state 504, and a standby state 506. The state machine 500 continuously monitors the states of the ExBBU 210 and requests the MCU 412 to execute transitions between the three states.

Under the discharge state 502, the external power source is inactive. The MCU 412 instructs the battery cell set 410 to discharge the power stored in the plurality of battery cells. The MCU 412 also instructs the power selector 414 to select the discharged power to charge the backend system 100.

Under the charge state 504, the external power source is active. The MCU 412 instructs the charging controller 404 to direct the external power source to charge the battery cell set 410. The MCU 412 also instructs the power source selector 414 to select the external power source to charge the backend system 100.

Under the standby state 506, the battery cell set 410 is neither charging nor discharging. Rather, it waits for commands from the MCU 412. The standby state 506 may also suggest possible malfunctioning of the charger's integrated circuit (IC) in the MCU 412. The charger IC may malfunction because an internal failure of the MCU 412, or because the operating voltage level of the battery cell set 410 drops below a critical voltage level. Under this state, the MCU 412 may also instructs the power selector 414 to stop directing the selected power to the signaling coupling unit 416.

Transitions between the states 502, 504 and 506 are hereby described in detail.

In one example, the transition from the discharge state 502 to the charge state 504 is activated by a charge event. A charge event may be triggered when: (1) the external power source converts from an inactive state to an active state; and/or (2) the operating voltage level of the battery cell set 410 drops below a lower-threshold level. Under the charge event, the MCU 412 instructs the battery cell set 410 to stop discharging. The MCU 412 also instructs the charging controller 404 to direct the external power source to charge the battery cell set 410. The MCU 412 further instructs the power selector 414 to select power from the power relay 402, i.e. from the external power source.

In one example, the transition from the charge state 504 to the standby state 506 is activated by a standby event. A standby event may be triggered when the battery cell set 410's operating voltage level exceeds an upper-threshold level. Under the standby event, the MCU 412 instructs the charging controller 404 to stop directing external power to the battery cell set 410 to prevent over-charging.

In one example, the transition from the standby state 506 to the charge state 504 is activated by a charge event. A charge event may be triggered when (1) the charger IC of the MCU 412 resumes functioning; and/or (2) the external power source is active. Under the charge event, the battery cell set 410 stops waiting for commands from the MCU 412, and the MCU 412 instructs the charging controller 404 to direct external power to charge the battery cell set 410. The MCU 412 also instructs the power source selector 414 to select external power to charge the backend system 100.

In one example, the transition from the charge state 504 to the discharge state 502 is activated by a discharge event. A discharge event may be triggered when the external power source turns inactive. Under the discharge event, the MCU 412 instructs the charging controller 404 to stop charging, the battery cell set 410 to discharge, and the power selector 414 to select power from the battery cell set 410.

In one example, the transition from the standby state 506 to the discharge state 502 is activated by a discharge event. A discharge event may be triggered when the external power source turns inactive. Under the discharge event, the battery cell set 410 stops waiting for commands from the MCU 412; and the MCU 412 instructs the battery cell set 410 to discharge, thereby replacing the external power source to power the backend system 100. The MCU 412 also instructs the power selector 414 to select the discharged power provided by the battery cell set 410.

In one example, the transition from the discharge state 502 to the standby state 506 is activated by a standby event. A standby event may be triggered when: (1) the external power source turns active; and/or (2) the operating voltage level of the battery cell set 410 exceeds an upper-threshold level. Under the standby event, the MCU 412 instructs the battery cell set 410 to stop discharging and to wait for further commands from the MCU 412.

Figure 6:
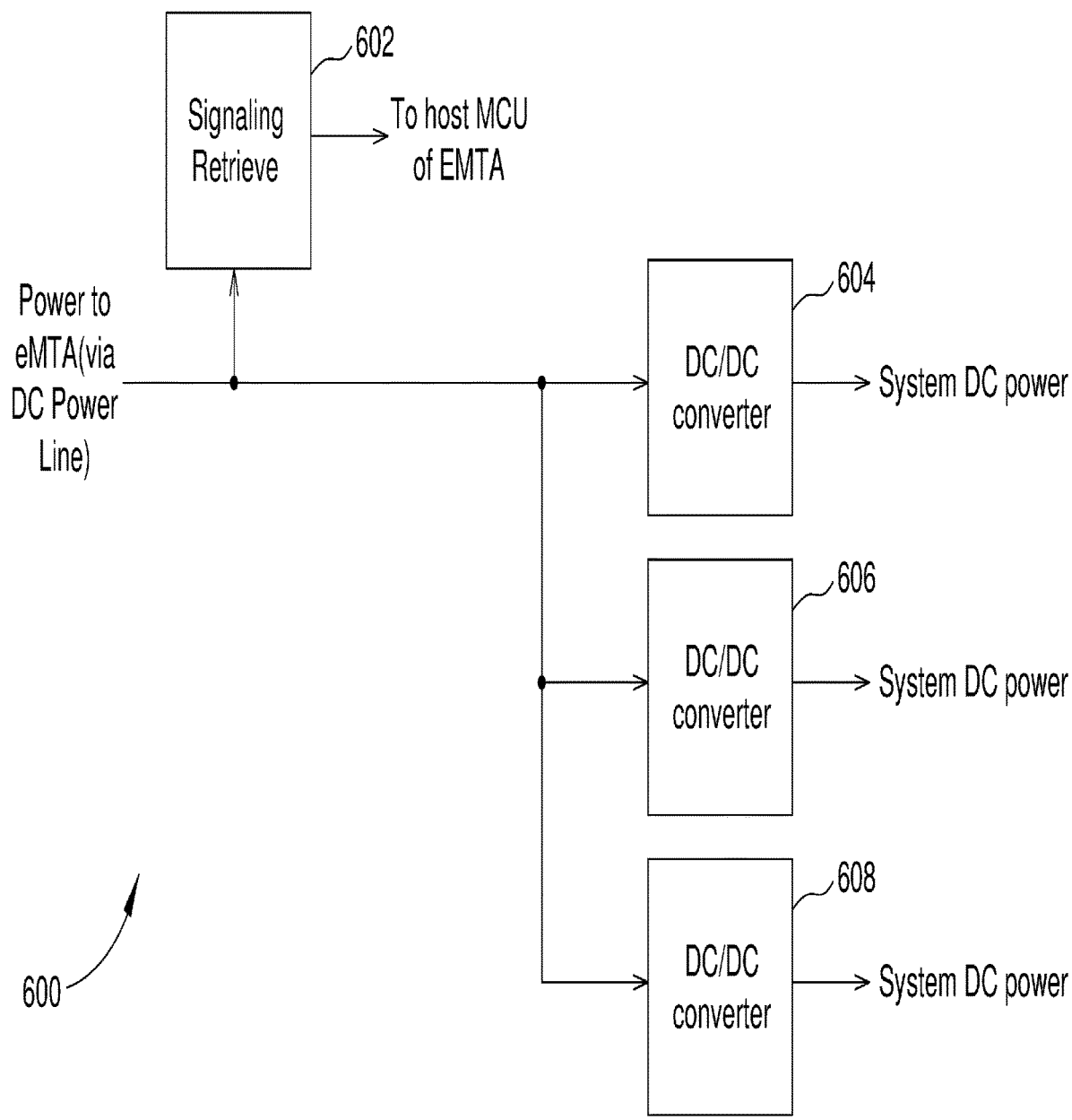
FIG. 6 is a schematic diagram of a host eMTA interface to which the disclosed ExBBU provides selected power source and data envelopes that carry the ExBBU's system information.

FIG. 6 is a schematic diagram of a host eMTA interface 600 of the backend system 100 to which the ExBBU 210 provides selected power source and data envelopes that carry the ExBBU 210's system information. The backend system 100 includes at least a signaling retrieve unit 602 and a plurality of DC/DC converters 604, 606 and 608.

The signaling retrieve unit 602 receives the ExBBU 210's system information via the DC power line and transmits the system information to a host MCU. The host MCU can therefore be informed of the ExBBU 210+s conditions and respond accordingly. The DC/DC converters 604, 606 and 608 are connected to different elements of the backend system 100. These different elements are responsible for different functions of the backend system 100. The DC/DC converters 604, 606 and 608 transmit received DC power to respective connected elements of the backend system 100 for respective functions.

In one example, the data envelope carrying the ExBBU 210's system information may be generated in the data format of Management Information Base (MIB).

Figure 7:
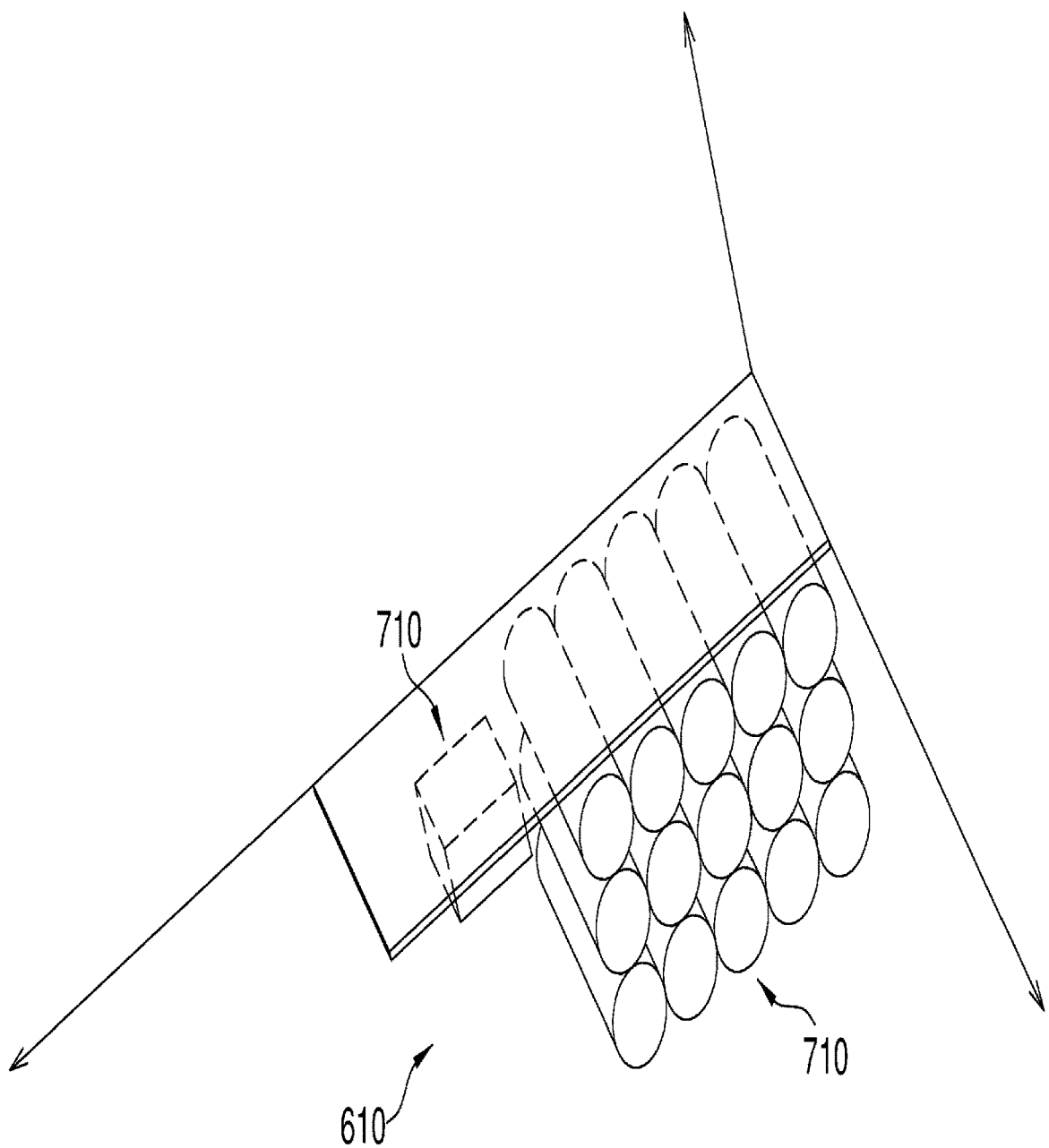
FIG. 7 is a simplified schematic structural diagram of a battery cell set of the ExBBU shown in FIG. 4.

FIG. 7 is a schematic structural diagram of the battery cell set 410 according to one example of the present invention. As shown in FIG. 7, the battery cell set 410 includes at least a printed circuit board (PCB) 710 and a plurality of the battery cells 720 arranged in stacks. The PCB 710 monitors and/or controls each battery cell of the battery cell set 410 according to the instructions from the charging controller 404, the voltage and current monitoring unit 406, the battery protector 408 and/or the MCU 412.

From the foregoing, it will be appreciated that specific embodiments have been described herein for purposes of illustration, but that various modifications may be made without deviating from the spirit and scope of the present technology. Moreover, aspects described in the context of particular embodiments may be combined or eliminated in other embodiments. Further, although advantages associated with certain embodiments have been described in the context of those embodiments, other embodiments may also exhibit such advantages, and not all embodiments need necessarily exhibit such advantages to fall within the scope of the present technology.

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of this document is not intended to be exhaustive or to limit this document to the precise form disclosed above. While specific examples for this document are described above for illustrative purposes, various equivalent modifications are possible within the scope of this document, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or sub-combinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

While the above description describes certain examples of this document, and describes the best mode contemplated, no matter how detailed the above appears in text, the present technology can be practiced in many ways. Details of the system may vary considerably in its specific implementation, while still being encompassed by the present technology disclosed herein. As noted above, particular terminology used when describing certain features or aspects of the present technology should not be taken to imply that the terminology is being redefined herein to be restricted to any specific characteristics, features, or aspects of the present technology with which that terminology is associated. In general, the terms used in the following claims should not be construed to limit the present technology to the specific examples disclosed in the specification, unless the above Detailed Description section explicitly defines such terms. Accordingly, the actual scope of the present technology encompasses not only the disclosed examples, but also all equivalent ways of practicing or implementing this document under the claims.

It can be appreciated by those skilled in the art that changes could be made to the examples described above without departing from the broad inventive concept thereof. It is understood, therefore, that this document is not limited to the particular examples disclosed, but it is intended to cover modifications within the spirit and scope of the present document as defined by the appended claims.

Further, in describing representative examples of the present document, the specification may have presented the method and/or process of the present document as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present document should not be limited to the performance of their steps in the order written, and one skilled in the art can readily appreciate that the sequences may be varied and still remain within the spirit and scope of the present document.

I claim:

1. An external battery backup unit, comprising:
   a battery cell set, comprising a plurality of battery cells;
   a power relay receiving power from an external power source;

a charging controller, coupled to the battery cell set and the power relay to receive the power of the external power source, monitoring a status of the battery cell set and the power relay in order to determine a charging current's amplitude;

a voltage and current monitoring unit, coupled to the charging controller and the battery cell set, transmitting the charging current from the charging controller to the battery cell set, wherein the voltage and current monitoring unit further monitoring the status of the battery cell set in order to control a discharging current's amplitude;

a microcontroller, coupled to the charging controller and the voltage and current monitoring unit, responding to a change of state of the charging controller, the voltage and current monitoring unit, and the battery cell set, and further generating the external battery backup unit's system information using at least one condition of the external battery backup unit, wherein the microcontroller further encapsulating the external battery backup unit's system information into a plurality of data envelopes; and a signaling coupling unit, coupled to the microcontroller, the external power source, and a backend system, transmitting power of the external power source or power provided by the battery cell set to charge the backend system via a DC power line, and further embedding the plurality of data envelopes into the transmitted power;

wherein the backend system is charged via the transmitted power and is informed of the external battery backup unit's system information via the plurality of embedded data envelopes.

2. The external battery backup unit of claim 1, wherein the status of the power relay comprises a temperature of the power relay, a voltage level of the external power source, a current amplitude of the external power source, and data indicating whether the power relay is working normally.

3. The external battery backup unit of claim 2, wherein the charging controller increasing the charging current's amplitude if the temperature of the power relay drops, when the voltage level of the external power source increases, or when the power relay is not working normally for a period of time; and wherein the charging controller decreasing the charging current's amplitude if the temperature of the power relay rises, when the voltage level of the external power source decreases, or when the power relay has been working normally for a period of time.

4. The external battery backup unit of claim 1, wherein the status of the battery cell set comprises an operating temperature or an operating voltage level of the battery cell set.

5. The external battery backup unit of claim 4, wherein the charging controller increasing the charging current's amplitude when the temperature or the operating voltage level of the battery cell set drops; and wherein the charging controller decreasing the charging current's amplitude when the temperature or the operating voltage level of the battery cell set increases.

6. The external battery backup unit of claim 1, wherein the status of the battery cell set which the voltage and current monitoring unit monitors in order to control the discharging current's amplitude comprises a current flow direction, an operating voltage level, or an operating temperature of the battery cell set.

7. The external battery backup unit of claim 6, wherein the voltage and current monitoring unit determining if the current enters or exits the battery cell set;

wherein if the current is determined to enter the battery cell set, the voltage and current unit further determining whether the battery cell set is charged by the charging current; and wherein if the current is determined to exit the battery cell set, the voltage and current unit further determining whether the battery cell set provides the discharging current.

8. The external battery backup unit of claim 7, wherein if the voltage and current monitoring unit determines that the battery cell set provides the discharging current, the voltage and current monitoring unit further increasing the discharging current's amplitude if the operating voltage level of the battery cell set exceeds an upper-threshold level or if the operating temperature of the battery cell set drops below a lower-threshold temperature.

9. The external battery backup unit of claim 7, wherein if the voltage and current monitoring unit determines that the battery cell set provides the discharging current, the voltage and current monitoring unit further decreasing the discharging current's amplitude if the operating voltage level of the battery cell set drops below a lower-threshold level or if the operating temperature of the battery cell set exceeds an upper-threshold temperature.

10. The external battery backup unit of claim 1, further comprising:

a power source selector, coupled to the power relay, the voltage and current monitoring unit and the signaling coupling unit, selecting power transmitted from the power relay or discharged by the battery cell set via the discharging current based on the microcontroller's commands, and further transmitting the selected power to the signaling coupling unit.

11. The external battery backup unit of claim 1, further comprising:

a battery protector, coupled to the battery cell set, the voltage and current monitoring unit, and the microcontroller, and independently and simultaneously regulating at least one of the plurality of battery cells.

12. The external battery backup unit of claim 1, wherein the microcontroller utilizes a state machine that has a discharge state, a charge state, and a standby state;

wherein under the discharge state, the microcontroller instructing the battery cell set to discharge power from the plurality of battery cells to charge the backend system and instructing the power selector to select the power discharged by the battery cell set;

wherein under the charge state, the microcontroller instructing the charging controller to direct the power of the external power source to charge the battery cell set; and wherein under the standby state, the battery cell set is neither charging nor discharging but waiting for commands from the microcontroller.

13. The external battery backup unit of claim 12, wherein the state machine changes from the discharge state to the charge state when the microcontroller instructs the battery cell set to stop discharge and the power selector to select power from the external power source due to (1) the external power source converting from an inactive state to an active state; and/or (2) an operating voltage level of the battery cell set dropping below a lower-threshold level.

14. The external battery backup unit of claim 12, wherein the state machine changes from the charge state to the standby state when the microcontroller instructs the charging controller to stop directing power from the external power source to the battery cell set due to the battery cell set's operating voltage level exceeding an upper-threshold level.

15. The external battery backup unit of claim 12, wherein the state machine changes from the standby state to the charge state when the battery cell set stops waiting for commands from the microcontroller due to (1) a charger integrated circuit of the microcontroller resuming functioning; and/or (2) the external power source becoming active.

16. The external battery backup unit of claim 12, wherein the state machine changes from the charge state to the discharge state when the microcontroller instructs the charging controller to stop charge and the power selector to select power discharged from the battery cell set.

17. The external battery backup unit of claim 12, wherein the state machine changes from the standby state to the discharge state when the battery cell set stops waiting for commands from the microcontroller due to the external power source becoming inactive.

18. The external battery backup unit of claim 12, wherein the state machine transits from the discharge state to the standby state when the microcontroller instructs the battery cell set to stop discharge due to: (1) the external power source becoming active; and/or (2) an operating voltage level of the battery cell set exceeding an upper-threshold level of the battery cell set.

19. The external battery backup unit of claim 1, wherein at least one of the plurality of data envelops is of a data format of Management Information Base (MIB).

20. The external battery backup unit of claim 1, wherein the microcontroller generates at least one of the plurality of data envelopes using On/Off Key (OOK) modulation, Frequency Shift Key (FSK) modulation, and/or Non-Return to Zero (NRZ) modulation.

21. The external battery backup unit of claim 1, wherein the signaling coupling unit comprises an interference-reducing element to filter out interferences on the DC power line.

22. The external battery backup unit of claim 21, wherein the interference-reducing element comprises a diode or a transistor.

23. The external battery backup unit of claim 1, wherein the backend system is an embedded multimedia terminal adaptor (eMTA) system.

24. The external battery backup unit of claim 1, wherein the plurality of battery cells are aligned and connected in series, in parallel, or in form of a matrix.

* * * * *